Figure 1:
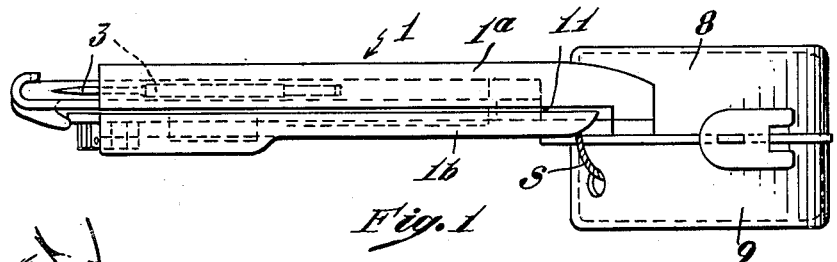

Jan. 27, 1953  C. A. FLOOD  2,626,393
STRAND JOINING DEVICE
Filed April 4, 1952  5 Sheets-Sheet 1

Inventor
Carl A. Flood
by Roberts, Cushman & Grover
Attys

Jan. 27, 1953 C. A. FLOOD 2,626,393
STRAND JOINING DEVICE
Filed April 4, 1952 5 Sheets-Sheet 2
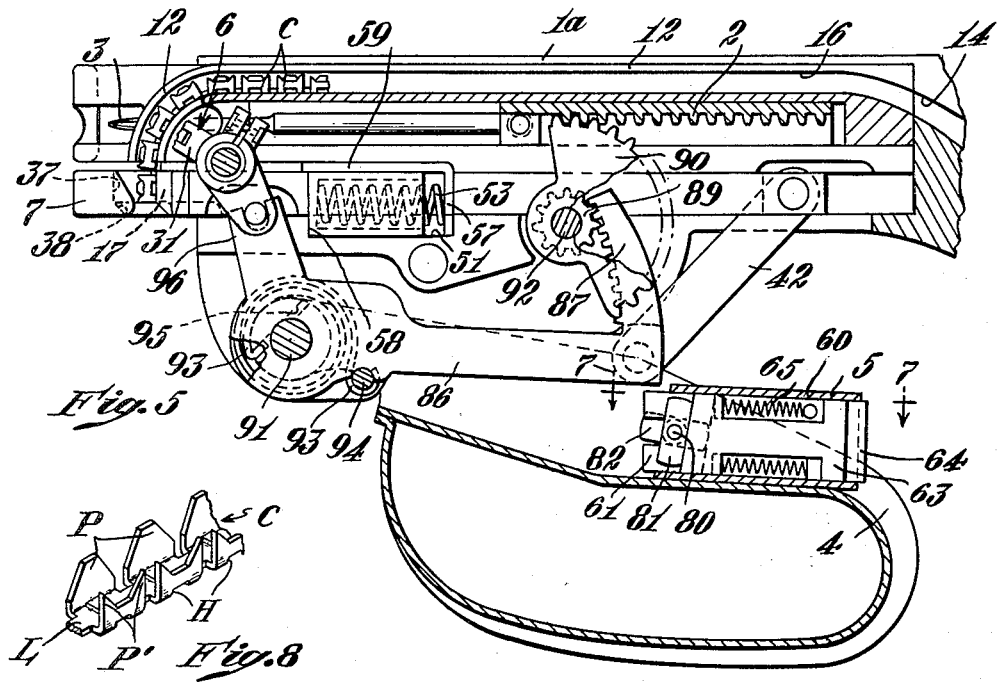
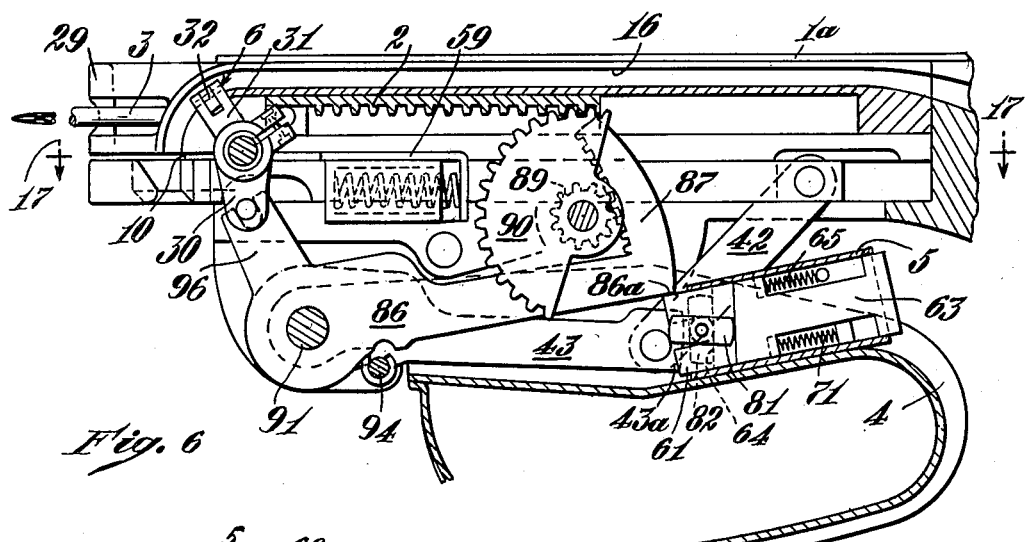
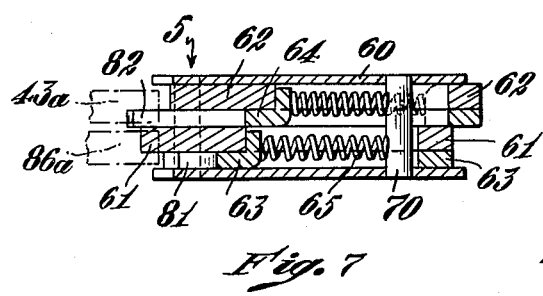
Inventor
Carl A. Flood
by Roberts, Cushman & Grover
Attys

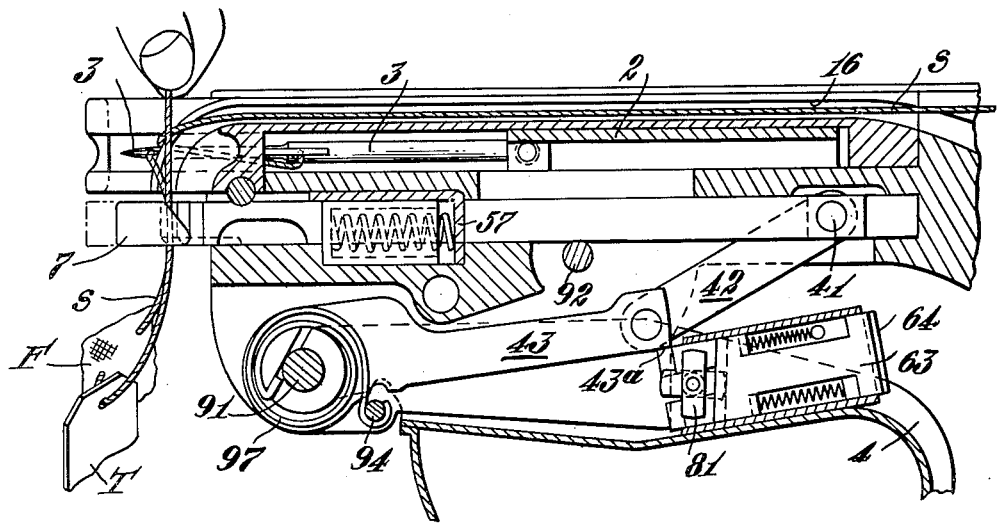

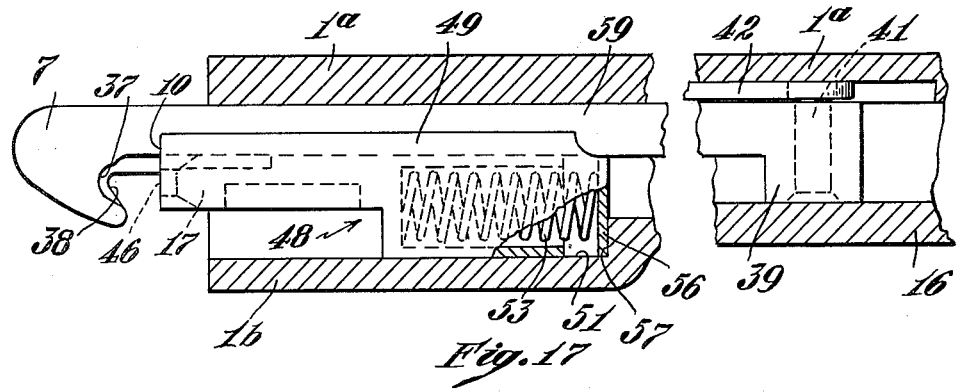
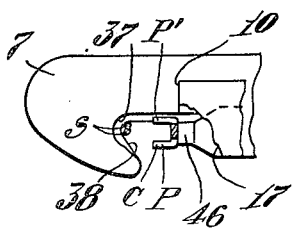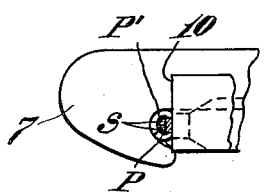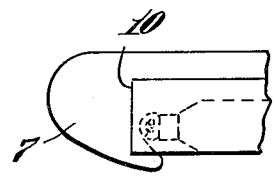
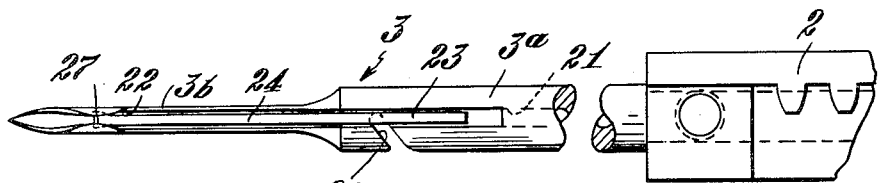
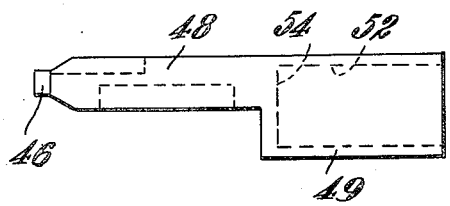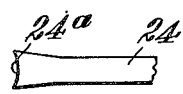

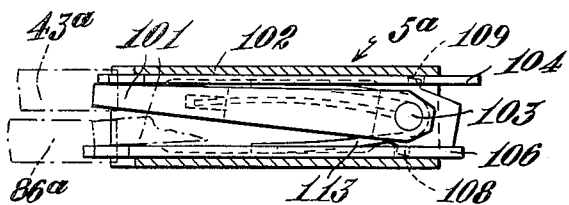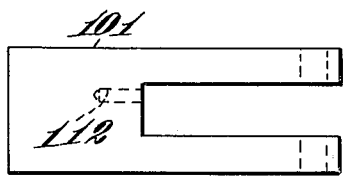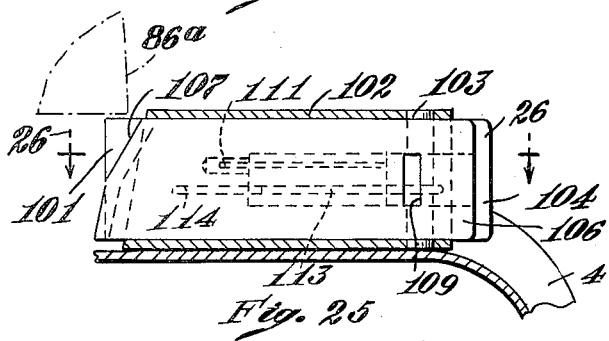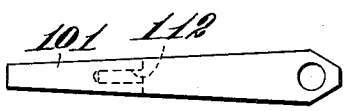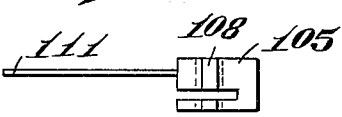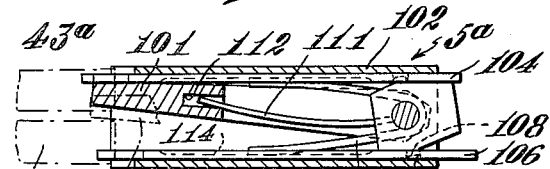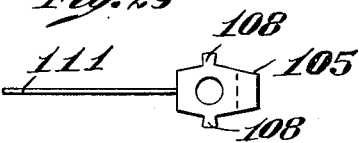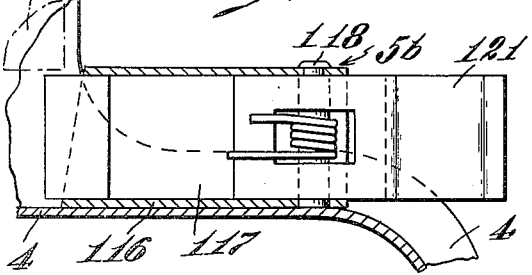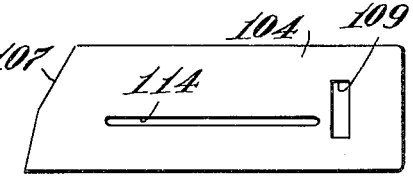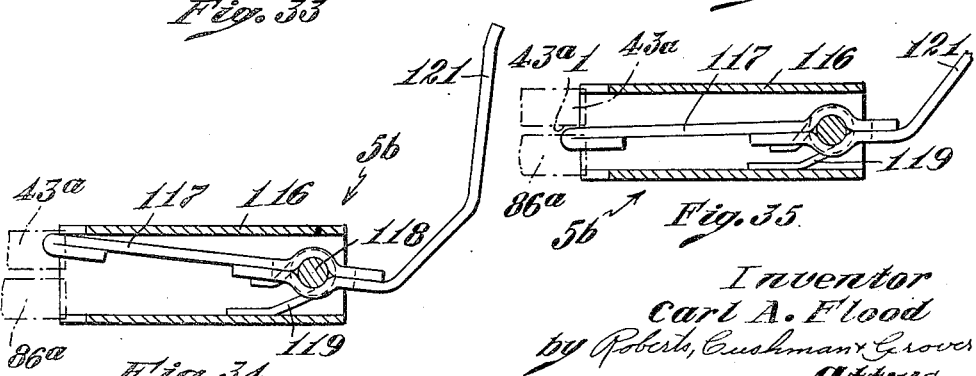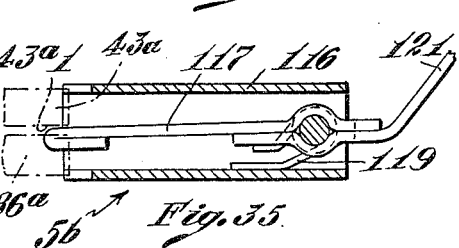

Patented Jan. 27, 1953

2,626,393

UNITED STATES PATENT OFFICE 2,626,393

STRAND JOINING DEVICE

Carl A. Flood, Framingham, Mass., assignor to Dennison Manufacturing Company, Framingham, Mass., a corporation of Massachusetts Application April 4, 1952, Serial No. 280,520

7 Claims. (Cl. 1—187)

This invention relates to improvements in manually operated tools or devices for joining strands of string or the like, and particularly to a device for securing string loops to various articles, the loop being suitable for attaching a price ticket or identifying tag to the article, this being an improvement on the device disclosed in my copending application, Serial No. 254,147, filed October 31, 1951. As disclosed in the aforesaid application a string loop may be secured to an article by passing one end of the string through the article, retaining the end which has thus been advanced through the article and bringing this end into engagement with another portion of the string beyond the edge of the article, and then joining the juxtaposed string portions with a clip which has been fed into position to be clinched about the juxtaposed strands.

Broadly, the objects of the present invention are to provide a device of simple construction by which the clip and strand feeding and joining operations are conveniently produced by one hand of the operator leaving the other hand free to manipulate the strand.

In one aspect the invention involves a tool for joining two juxtaposed portions of a strand with a clip, the tool comprising a frame holding a supply of clips, a device for clinching the arms of a clip around juxtaposed strand portions, a feeder for advancing the clips to the clinching device, mechanism for actuating the feeder and clinching device including a pair of levers or other members movably mounted on the frame and having shoulders disposed side by side and moving along adjacent paths which are substantially parallel, a hand lever or like actuator for driving the aforesaid members, and an interposer device carried by the actuator and movable therewith into abutment with one of the shoulders on the members so as to connect the actuator operatively with one of the members, the interposer device being adjustable between two operative conditions alternately to abut one shoulder or the other during alternate movements of the actuator, the interposer device being arranged so that while it is abutting one shoulder to drive the corresponding member the interposer device also engages the other shoulder to control the aforesaid adjustment of the device to its next operative condition, so that clip feeding and clinching operations are automatically performed by successive operations of the actuator.

In a more specific aspect the interposer device comprises an interposer movable between two conditions each of which one of said shoulders is abutted, and a pair of cam slides operatively cammed by the shoulder which is not abutted by the interposer to urge the interposer from one position to another. Preferably resilient means are provided for interconnecting said slides and said interposer yieldingly to urge the interposer from one position to another. The interposer may comprise a pair of interposer slides each of which moves in and out of a path approaching one of the aforesaid shoulders respectively, or it may comprise a pivoted arm which swings between two paths approaching said shoulders.

Figure 2:
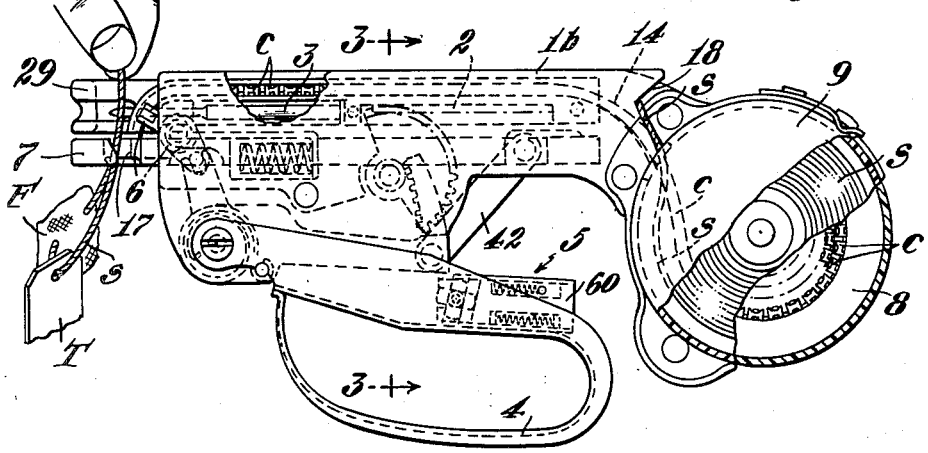
Figures 3, 4:
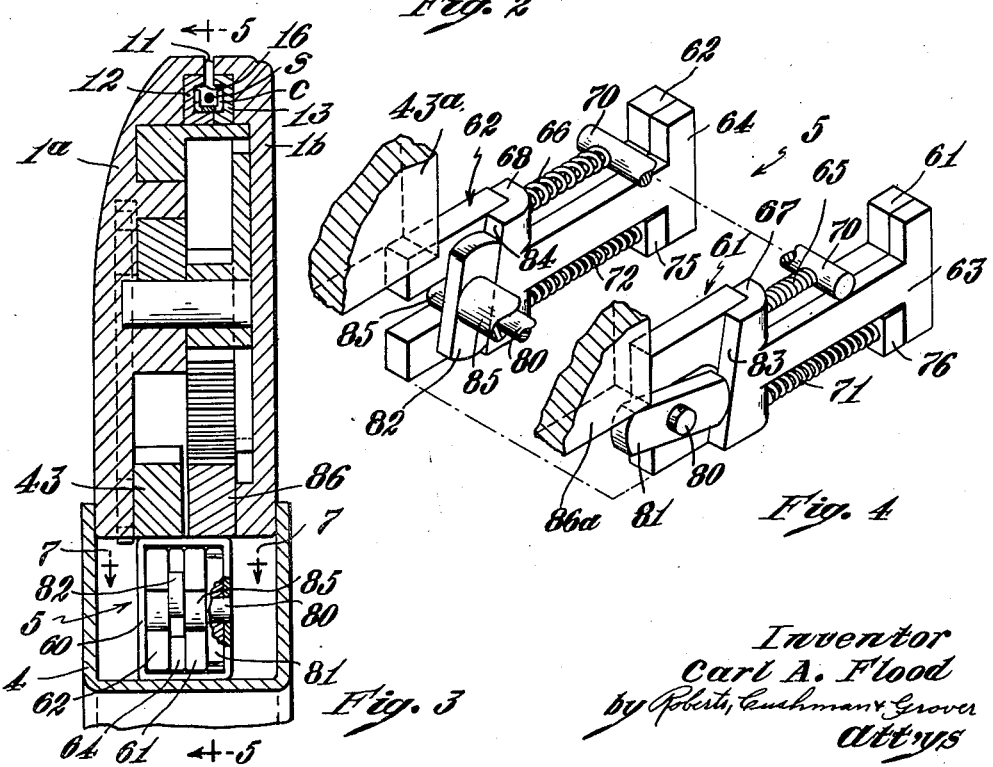

For the purpose of illustration a typical embodiment of the invention shown in the accompanying drawings in which:

Fig. 1 is a plan view of a tag attaching device;
Fig. 2 is a side elevation of the device;
Fig. 3 is a section on line 3—3 of Fig. 2;
Fig. 4 is an exploded isometric view of an interposer device;
Fig. 5 is an enlarged section on line 5—5 of Fig. 3, parts being broken away;
Fig. 6 is a section like Fig. 5 showing the parts in one operative position;
Fig. 7 is a section on line 7—7 of Fig. 5;
Fig. 8 is an isometric view of a ribbon of clips;
Fig. 9 is a view like Fig. 5 showing another operative position of the device;
Figs. 10 and 11 are sections like Fig. 7 showing the interposer device before and after the operation of Fig. 9;
Figs. 12 and 13 are side elevations of parts of the interposer device;
Fig. 14 is a plan view of the part shown in Fig. 13;
Fig. 15 is a section on line 15—15 of Fig. 16;
Fig. 16 is a section on line 16—16 of Fig. 15;
Fig. 17 is a section on line 17—17 of Fig. 6, parts being omitted;
Figs. 18 to 20 are sections like Fig. 17 showing various operative positions of the device;
Fig. 21 is a side elevation of a strand feeding needle;
Fig. 21a is a side elevation of a detail of the needle;
Fig. 22 is a plan view of the needle;
Fig. 23 is a plan view of a staple clinching anvil;
Fig. 24 is a plan view of a modified interposer device;
Fig. 25 is a side elevation;
Fig. 26 is a section on line 26—26 of Fig. 25;
Figs. 27 to 32 show parts of the modification of Fig. 24;
Fig. 27 is a side elevation;
Fig. 28 is a plan view;
Fig. 29 is a side elevation;
Fig. 30 is a plan view;
Fig. 31 is a side elevation;
Fig. 32 is a plan view;
Fig. 33 is a side elevation of another modification of the interposer device, parts being shown in section; and
Figs. 34 and 35 are plan views of the modification of Fig. 33, parts being shown in section.

In the illustrative embodiment shown in the drawings the attaching device comprises a frame 1, a rack 2 carrying a needle 3, a clip feeding mechanism 6, a clinching and cutting die 7, a hand lever 4 carrying an interposer device 5 for operating the rack, and clip feeding mechanism and clinching die and two magazines 8 and 9 respectively containing a supply of clips C and string S.

As shown in Fig. 8 the clips C are formed with complementary arms P and P' and are joined by a lug portion L holding the clips in an elongate ribbon form. A shoulder H formed by an indentation in the underside of each clip forms a convenient abutment for feeding engagement of the clips. It is of course obvious that any form of clip having points or arms P may be used for securing the strands in a loop.

The frame 1 has two portions 1a and 1b spaced apart at the top of the frame to form a slot 11. At the rear ends of the frame the frame portion 1a has a groove 14 for guiding the ribbon of clips C as it leaves the clip magazine 8. The groove 14 connects with a channel 16 formed by two insert pieces 12 and 13 respectively fitting in the frame portions 1a and 1b. The forward ends of the inserts 12 and 13 are curved downwardly towards an anvil 17 which cooperates with the die 7 to clinch the clips as will be explained hereafter. The string S is fed from within the magazine 9 through a notch 18 in the frame portion 1b into the channel 16 to the forward ends of the frame. At the forward end of the frame the strand passes out through the slot 11 formed by the spaced frame portions 1a and 1b to the needle 3 (Fig. 9). As shown in Fig. 3, the section of strand in the channel 16 lies between the upturned arms P and P' of the clips C.

The needle 3 and rack 2 are contained in the frame so as to slide between a retracted position shown in Fig. 5 and a forwardly advanced position shown in Fig. 6. Sliding movement is imparted to the rack by movement of the hand lever 4 transmitted through the interposer device 5, the lever 86, a curved rack 87, a gear wheel 89 and a segmental gear 90. As is shown in Fig. 6, the interposer device 5 may engage a shoulder 86a of the lever 86 swinging it about its pivot pin 91. The curved rack 87 carried by the lever 86 meshes with the gear wheel 89. The gear wheel 89 and segmental gear 90 joined therewith rotate together on a pin 92, the segmental gear 90 meshing with the rack 2. A coiled spring 93 hooked at one end around a stop pin 94 engages in a slot 95 in the lever 86 urging the lever toward the normal position shown in Fig. 5 against the stop pin 94. The forward end of the needle is protected by a guard 29 when the needle is in retracted position. When the needle is in forward position it advances beyond the guard as shown in Fig. 6 to a position where the end of the string may be served through a fabric article or inserted through a portion of some other article. It is intended that after the string has been sewed or inserted through the article the end of the string will be gripped by the hand of the operator and the needle allowed to retract behind the guard. If a fabric article has been sewed the guard 29 prevents the fabric from being drawn along with the needle as it retracts into the frame.

As shown in detail in Figs. 21, 21a and 22 the needle 3 carried by the rack 2 comprises a thick portion 3a and a thin portion 3b. A channel 21 extends interiorly of the needle from the thick portion 3a through the thin portion 3b. The thin portion 3b has a longitudinal slit 22 communicating with the channel 21. At its end the needle has a pair of opposed lips 27 which overlie the channel 21 to a greater extent than slit 22. A spring finger 23 secured at one end to the thick needle portion 3a has a resilient tip 24 extending into the channel 21 through the slit 22. The spring finger has a flared end 24a underlying the lips 27. Adjacent the juncture of the thick and thin portion the thick portion 3b has a transverse slot 26 which cuts through the internal channel 21 and communicates with the longitudinal slit 22. The needle is threaded by disposing the strand in the transverse slot 26 and then directing it along the longitudinal slot 22. Toward its ends the strand is then engaged under one of the lips 27 at the forward end of the needle. When the strand is drawn tight it will slide under the spring finger 24 and be clamped against the wall of the channel 21 by the flared end 24a of the spring finger. The concave configuration of the flared end 24a (Fig. 21a) prevents the strand from being displaced from under the finger 24. The spring finger has sufficient tension such that when the needle is advanced the finger 24 will draw the strand from the magazine 9, but the tension does not prevent manually drawing the strand from its magazine.

The clip feeding mechanism shown in detail in Figs. 6, 15 and 16 comprises a bell crank 6, one arm 31 of which carries a pawl 32. The pawl 32 is pivotally mounted at 33 and has a finger 34 extending into the channel 16 formed by the insert pieces 12 and 13. A helical spring 36 yieldingly urges the finger 34 into the indentation forming the shoulder H of the clips C. Another arm 30 of the bell crank 6 carries a pin 35 which couples the arm 30 with an arm 96 of the lever 86. Thus when the hand lever 4 and interposer 5 swing lever 86 to advance the needle and rack the lever arm 96 rotates the bell crank clockwise (Fig. 6). When the bell crank 6 is rotated clockwise as shown in Fig. 6 (counterclockwise as shown in Fig. 15) the finger 34 ratchets back into engagement with the forward shoulder H of one of the clips C of the ribbon. Thereafter when the bell crank is allowed to rotate (counterclockwise as shown in Fig. 15) the ribbon will be advanced the length of one clip, the foremost clip being advanced from the channel formed by the inserts 12 and 13 to a position next to the anvil 17 as shown in Fig. 5. Because the foremost clip is connected to the ribbon by the lug L it will be held in clinching position by the finger 34 engaging the ribbon.

The strand S, before or after being sewn through a piece of fabric F, may also be inserted through a tag or price ticket T (Figs. 2 and 9). The strand portions between the tip of the needle 3 and the portion at the end of the strand are then manually laid inside the die 7. As shown in Figs. 5 and 17 the die 7 has a curved clinching wall 37, and adjacent the clinching wall a strand spacing ridge 38 adapted to hold the juxtaposed portions of the strand spaced from the clinching wall 37 so that the points of the arms P and P' will not catch the strand while being clinched. The die 7 is part of an elongate plunger 39 sliding between the two frame portions 1a and 1b. The rear end of the plunger 39 is pivotally attached at 41 to a toggle member 42. The toggle member 42 is connected with a second toggle member 43 pivotally attached to the frame by a pin 91. The toggle member 43 is normally held against the stop pin 94 by a coiled spring 97 like coiled spring 93. As shown in Fig. 9 the toggle formed by members 42 and 43 may be straightened by movement of the hand lever 4 causing the selector device 5 to engage lever 43 at its shoulder 43a. When the toggle 42 and 43 is straightened the plunger 39 is urged rearwardly carrying the clinching face 37 of the die 7 against the anvil 17. The anvil 17 comprises the forward face of a sliding block 48 shown in detail in Fig. 23. The rear portion 49 of the block 48 is guided in a space 51 (Figs. 5 and 17) formed by the frame members 1a and 1b. The rear block portion 49 has an internal chamber 52 for guiding a helical spring 53 which is compressed between the forward wall 54 of the chamber 52 and a plate 56 which bears against an abutment 57 formed by the frame portion 1b. Forward movement of the block 48 is prevented by an abutment 58 formed by the frame portions 1a and 1b (Fig. 5). The plate 56 forms a flange on a knife member 59 which extends alongside the die carrying block 48 and terminates in a cutting portion 10 adjacent the die face 46.

As the die 7 is urged rearwardly by toggle members 42 and 43 the clinching wall 37 cooperates with the anvil face 46 to turn the arms P and P' around the juxtaposed portions of the strand S. Thereafter, as the die is urged further the spring 53 yields allowing the block 48 to move rearwardly with the die 7. The anvil face 46 then passes rearwardly of the cutting edge 10 of the knife carrying the lug portion L of the clip and juxtaposed portions of the strand past the knife and shearing the clip from the ribbon and the clipped strand portions from the strand. The steps of the clinching and cutting operations are illustrated in Figs. 18 to 20. In Fig. 18 the foremost clip C is in position against the anvil face 46, and the two strands S of the string loop are engaged in the die 7. As the die 7 moves to the intermediate position shown in Fig. 19 the points P and P' are turned around the strands S by the clinching wall 37, and thereafter force is transmitted from the clinching wall through the clip and strands 37 to the anvil face 46. On further movement of the die 7 the anvil retracts rearwardly to the position shown in Fig. 20 and the clinching wall 37, the anvil, the clinched clip, and the strands S are carried past the edge 10 of the knife. During this movement the knife edge 10 and the clinching wall 37 interact to shear the lug L of the clip and the portions of the strands S which extend beyond the clinching wall 37 through the plane of the cutting edge 10.

According to the present invention the toothed lever 86 and toggle 43 are disposed side by side and coaxially pivoted on the pivot pin 91 so that the shoulders 86a and 43a are closely adjacent and move along parallel paths, and the hand lever 4 actuates the toothed lever 86 and the toggle lever 43 as the result of alternate abutment of the shoulder 86a and shoulder 43a by the interposer device 5 on successive actuations of the hand lever. The shoulders also control the interposer device as follows. The interposer device 5 of Figs. 5 to 7, and 9 to 14 comprises a casing 60 attached to the hand lever 4, a pair of interposer slides 61 and 62 and a pair of cam slides 63 and 64 slidably confined in the casing. The cam slides 63 and 64 are urged forwardly in the casing respectively by helical springs 65 and 66 compressed between a pin 70 mounted transversely of the casing and upper flanges 67 and 68 extending laterally from cam slides 63 and 64 respectively. A second pair of helical springs 71 and 72 are compressed respectively between lower flanges 73 of the interposer slides and flanges 75 and 76 extending laterally of each of the interposer slides 61 and 62. The cam slide flanges 63 and 64 engage shoulders 77 of the interposer slides 61 and 62 and urge the respective interposer slides forwardly, while the compression springs 71 and 72 yieldingly urge the respective interposer slides rearwardly.

A shaft 80 mounted transversely of the casing 60 rotatively supports a hub 85 carrying a pair of spaced cam arms 81 and 82. The cam arms are disposed at right angles to each other and spaced apart so that arm 81 swings into camming engagement with a cam face 83 on cam slide 61, while arm 82 is swung out of engagement with a cam surface 84 on cam slide 64, and vice versa. Rotation of the hub 85 and arms 81 and 82 results in an intermittent sliding movement of the cam slides 63 and 64 as will be more fully explained.

The interposer device 5 is fixed in such a position that the hand lever 4 when squeezed swings one of the interposer slides 61 or 62 and one of the cam arms 81 or 82 toward and into contact with the shoulder 86a of the rack carrying lever 86, and the shoulder 43a of the toggle lever 43. The interposer slide 61 when in forward position and cam arm 81 when in horizontal position move on a path approaching the shoulder 86a, while the other interposer slide 62 and cam arm 82 when in like positions move on a path approaching the shoulder 43a. The terms "horizontal" and "vertical" are here used roughly to distinguish between the positions of cam arms 81 and 82 respectively as shown in Fig. 4. The purpose of each interposer slide is to engage its respective shoulder and transmit the movement of the hand lever to the corresponding lever. Only one interposer slide is in forward position, and only one cam arm is in horizontal position at one time. The function of the cam arms is to move the interposer slides 61 and 62 alternately into and out of paths approaching the shoulders 86a and 43a respectively by camming the cam slides 63 and 64 which control the position of each interposer slide. Thus while one of the interposer slides is engaging shoulder 86a the cam arm will be engaged by the other shoulder 43a to determine or control the next position of the interposer slides.

The interposer device between successive actuations will be in the condition shown in Figs. 3, 5 and 7, with interposer slide 61 advanced and cam arm 82 horizontal, or in the condition shown in Figs. 4 and 10, with interposer slide 62 advanced and cam arm 81 horizontal.

Assuming the interposer device to be in the first condition (Figs. 3, 5 and 7), when the hand lever 4 is squeezed the interposer slide 61 engages the shoulder 86a swinging the lever 86 toward the position shown in Fig. 6 so as to actuate the needle rack 2 and clip feeding crank 6 as previously described. As the hand lever is squeezed further the shoulder 43a is engaged by the cam arm 82. The force of the coiled spring 97 is not overcome by the arm 82, and hence the arm 82 is swung causing the hub 85 to rotate and move cam arm 81 to the horizontal position shown in Fig. 6. The cam arm 81 thereby urges the cam slide 63 to the retracted position shown in Fig. 6 in which the spring 71 is compressed urging the interposer slide 61 rearwardly. The slide 61 will not move owing to frictional engagement with the shoulder 86a, until the hand lever 4 is released. At the same time that cam arm 81 has cammed the slide 63, arm 82 has swung out of the horizontal position in which it abutted the cam surface 84 and held its cam slide 64 in rearward position allowing the cam slide urged by helical spring 66 and the interposer slide 62 to slide forwardly until the interposer slide abuts the side of shoulder 43a. Thereafter when the hand lever is allowed to return to the normal position shown in Figs. 2 and 5, the interposer slide 61 will be released and will slide to retracted position while interposer slide 62 slides to advanced position, as shown in Figs. 4 and 10.

On the next successive actuation of the hand lever 4, the forward interposer slide 62 will engage the shoulder 43a of the toggle lever 43, as shown in Figs. 4 and 10, resulting in actuation of the toggle 42—43 and consequent operation of the clip clinching and cutting mechanism previously described. During the clinching operation the hub 85 and arms 81 and 82 will be rotated from the position shown in Fig. 10 to the position shown in Fig. 11. Thereafter, when the hand lever 4 is released the selector device 5 will return to the starting condition shown in Fig. 7.

Another embodiment of the interposer device is shown in Figs. 24 to 32. In this embodiment the interposer member comprises a pivoted arm 101 mounted in casing 102 on a pivot pin 103 so that it may swing back and forth between the two positions as shown in Fig. 24. In the position shown in full lines the interposer arm is in a position to abut the shoulder 43a of lever 43 when the hand lever 4 is actuated. In the position shown in broken lines the interposer arm 101 is in a position to abut the shoulder 86a of the clip feeding lever 86. Slidably mounted in the casing 102 are a pair of interposer slides 104 and 106. At their forward ends each of the slides 104 and 106 has a cam surface 107 adapted to be engaged by shoulders 43a and 86a respectively to move the cam slides between a forward position, occupied by slide 106 in Fig. 24, and a rear position, occupied by slide 104 in Fig. 24. The cam slides are operatively connected to the interposer arm 101 by an indexing member 105. The indexing member is pivotally mounted on the pin 103 and carries a pair of ears 108 engaging in openings 109 of the cam slides respectively. The indexing member also carries a flexible wire finger 111 intended to engage in the socket 112 in the interposer arm 101. When the cam slides 104 and 106 are moved to forward and rear positions respectively the indexing member because of engagement between the ears 108 and the openings 109 swings on its pivot so that the spring finger will be biased as shown in Fig. 26 and will tend to swing the interposer arm 101 to its alternate operative position. Either by frictional engagement of the interposer arm 101 with one of the shoulders (43a in Fig. 26) or by lateral engagement with the shoulder which it does not operate (86a in Fig. 26) the interposer will not shift to its alternate position until pressure on the hand lever 4 is released. A U-shaped spring 113 hooked around the pivot pin 103 frictionally engages grooves 114 in the cam slides respectively to hold the cam slides in their various adjusted positions.

The operation of the interposer device shown in Figs. 24 to 32 is as follows. With the interposer slide and the interposer arm in the position shown in broken lines in Fig. 24, when the hand lever 4 is actuated the interposer arm 101 will abut the shoulder 86a of the clip feeding lever swinging that lever upwardly and ratcheting the clip feeding mechanism 6. Shoulder 43a of the toggle lever 43 will engage the cam surface 107 of the cam slide 104 camming it to the position shown in Fig. 24. When pressure on the hand lever 4 is then released the interposer lever will swing from the position shown in broken lines in Fig. 24 to the position shown in solid lines. On the next actuation of the hand lever 4 the interposer arm 101 will engage shoulder 43a of the toggle lever 43, swing the toggle lever causing the clinching operation to be performed. At the same time shoulder 86a will cam slide 106 from the position shown in Fig. 24 to the position shown in Fig. 26. The indexing member 105 will swing the other cam slide 104 forwardly to a position under the shoulder 43 elevated by the interposer arm 101. At the same time the spring finger 111 will be biased as shown in Fig. 26 so that when the hand lever 4 is released the interposer arm will swing to the starting position shown in broken lines in Fig. 24. If it is desired to perform a clinching operation without first performing a clip feeding operation slide 104 may be urged forwardly by manual pressure on the end of the cam slide extending rearwardly from the casing 102.

A further modification of the interposer device is shown in Figs. 33 to 35 in which the device comprises a casing 116 in which an interposer lever 117 is pivotally mounted on a pin 118, a spring 119 urges the lever 117 to the position shown in Fig. 34. The lever 117 has an extension 121 outside the housing 116 for manual indexing of the interposer lever to the position shown in Fig. 35. The interposer lever 117 is normally held in the position shown in Fig. 34 to prevent inadvertent actuation of the clip feeding and needle advancing lever 86. Accidental operation of the hand lever 4 prior to a clip feeding actuation will merely result in movement of the clip clinching die which has no effect since there is no clip in position to be clinched. When it is desired to initiate a two-step clip feeding and clinching cycle the lever is swung to the position shown in Fig. 35 where it may engage the shoulder 86a of the clip feeding lever 86. As soon as the hand lever is thereafter actuated the lever 117 abuts the shoulder 86a and the extension 121 may be released allowing the lever 117a to swing to a position urged by spring 119 where it is stopped by the side 43a1 of shoulder 43a. The shoulder 43a thus controls the lever 117 so that not until the hand lever 4 is released may the lever 117 return to its normal position in which it may engage shoulder 43a for a clip clinching operation. In operations where the needle 3 presents a hazard or where the accidental feeding of an excess clip may interfere with subsequent clinching operations the embodiment shown in Figs. 33 to 35 is preferred.

Thus the hand lever has an operating cycle of two successive movements during the first of which the selector device operates the needle advancing rack 2 and the clip feeding mechanism 6. Each of these actuations requires the use of only one hand, the hand which grips the tag attaching tool. The hand lever can be easily held in the actuated position shown in Fig. 6 thus holding the needle and strand advanced from the frame 1. At the same time the operator's other hand is free to manipulate the article which is to be tagged.

It should be understood that the present disclosure is for the purpose of illustration only and that this invention includes all modifications and equivalents which fall within the scope of the appended claims. For instance the clip feeding and clinching mechanism may be replaced by any mechanism for joining the strand without departing from the scope of my invention.

I claim:

1. For joining two juxtaposed strand portions with a clip, a tool comprising a frame for holding a supply of clips, means for clinching a clip about said strand portions, means for advancing a clip to said clinching means, mechanism for actuating said means including a pair of movable members carrying shoulders disposed side by side and moving along adjacent paths which are substantially parallel, an actuator for driving said members, and interposer means carried by said actuator and movable therewith into abutment with one of said shoulders operatively to connect said actuator with one of said members, said interposer means being adjustable between two operative conditions alternately to abut said shoulders respectively during alternate movements of the actuator, while abutting one shoulder said interposer means engaging the other shoulder to control the adjustment of the interposer means to the next operative condition, whereby successive clip feeding and clinching operations are automatically performed by successive operations of said actuator.

2. The tool according to claim 1 characterized in that said interposer means comprises an interposer movable between two positions in each of which it abuts one of said shoulders, and a pair of cam slides alternately cammed by the shoulder not abutted by the interposer to urge the interposer from one position to another.

3. The tool according to claim 2 characterized by resilient means interconnecting said slides and said interposer yieldingly to urge said interposer from one position to another.

4. The tool according to claim 3 further characterized in that said interposer comprises a pair of interposer slides each sliding in and out of a path approaching one of said shoulders.

5. The tool according to claim 1 further characterized in that said interposer comprises a pivoted arm swinging between paths approaching said shoulders.

6. For joining two juxtaposed strand portions with a clip, a tool comprising a frame for holding a supply of clips, means for clinching a clip about said strand portions, means for advancing a clip to said clinching means, mechanism for actuating said means including a pair of movable members carrying shoulders disposed side by side and moving along adjacent paths which are substantially parallel, an actuator for driving said members, and interposer means carried by said actuator and movable therewith into abutment with one of said shoulders operatively to connect said actuator with one of said members, said interposer means being adjustable between two operative conditions alternately to abut said shoulders respectively during alternate movements of the actuator, while abutting one shoulder said interposer means engaging the other shoulder to control the adjustment of the interposer means to the next operative condition, whereby successive clip feeding and clinching operations are automatically performed by successive operations of said actuator, said interposer means comprising a pivoted arm swinging between two parallel paths to select one of said shoulders for abutment.

7. The tool according to claim 6 characterized by resilient means yieldingly urging said arm from one path to the other.

CARL A. FLOOD.

No references cited.